(12) United States Patent
Östman

(10) Patent No.: US 7,926,329 B2
(45) Date of Patent: Apr. 19, 2011

(54) APPARATUS FOR IDENTIFYING A NON-UNIFORM SHARE OF CYLINDER POWER IN AN INTERNAL COMBUSTION PISTON ENGINE SYSTEM

(75) Inventor: Fredrik Östman, Turku (FI)

(73) Assignee: WärtsiläFinland Oy, Vaasa (FI)

( * ) Notice: Subject to any disclaimer, the term of this patent is extended or adjusted under 35 U.S.C. 154(b) by 291 days.

(21) Appl. No.: 12/095,339

(22) PCT Filed: Nov. 21, 2006

(86) PCT No.: PCT/FI2006/050504
§ 371 (c)(1),
(2), (4) Date: Jul. 2, 2008

(87) PCT Pub. No.: WO2007/063177
PCT Pub. Date: Jun. 7, 2007

(65) Prior Publication Data
US 2008/0276697 A1    Nov. 13, 2008

(30) Foreign Application Priority Data
Nov. 30, 2005   (FI) ...................................... 20055629

(51) Int. Cl.
*G01M 15/04* (2006.01)
(52) U.S. Cl. .................. 73/114.13; 73/114.15
(58) Field of Classification Search ............... 73/114.13, 73/114.15
See application file for complete search history.

(56) References Cited

U.S. PATENT DOCUMENTS

| | | | |
|---|---|---|---|
| 4,843,870 A | 7/1989 | Citron et al. | |
| 5,592,386 A * | 1/1997 | Gaultier | 701/99 |
| 5,771,482 A | 6/1998 | Rizzoni et al. | |
| 5,794,171 A * | 8/1998 | Bryant et al. | 701/99 |
| 6,021,758 A | 2/2000 | Carey et al. | |
| 6,223,120 B1 * | 4/2001 | Williams | 701/111 |
| 6,866,024 B2 * | 3/2005 | Rizzoni et al. | 123/430 |
| 6,876,919 B2 * | 4/2005 | James et al. | 701/111 |
| 7,614,290 B2 * | 11/2009 | Shikama et al. | 73/114.25 |
| 2002/0148441 A1 | 10/2002 | Tuken | |
| 2003/0089338 A1 | 5/2003 | Remele et al. | |
| 2003/0209235 A1 | 11/2003 | Javaherian | |

FOREIGN PATENT DOCUMENTS
FI        89404       12/1987

\* cited by examiner

*Primary Examiner* — Freddie Kirkland, III
(74) *Attorney, Agent, or Firm* — Chernoff, Vilhauer, McClung & Stenzel

(57) ABSTRACT

The invention utilizes the firing order of the cylinders within the engine to identify the cylinder or cylinders that mainly contribute or, alternatively, contribute as little as possible to the production of certain harmonic frequencies in the engine's torque. In order to use the engine's torque for this purpose, the calculation of torque must take into account the non-linearities of the engine system. Thus the calculation of torque takes into account not only the properties of the engine but also the properties of the load and the shaft.

18 Claims, 4 Drawing Sheets

Figure 1:
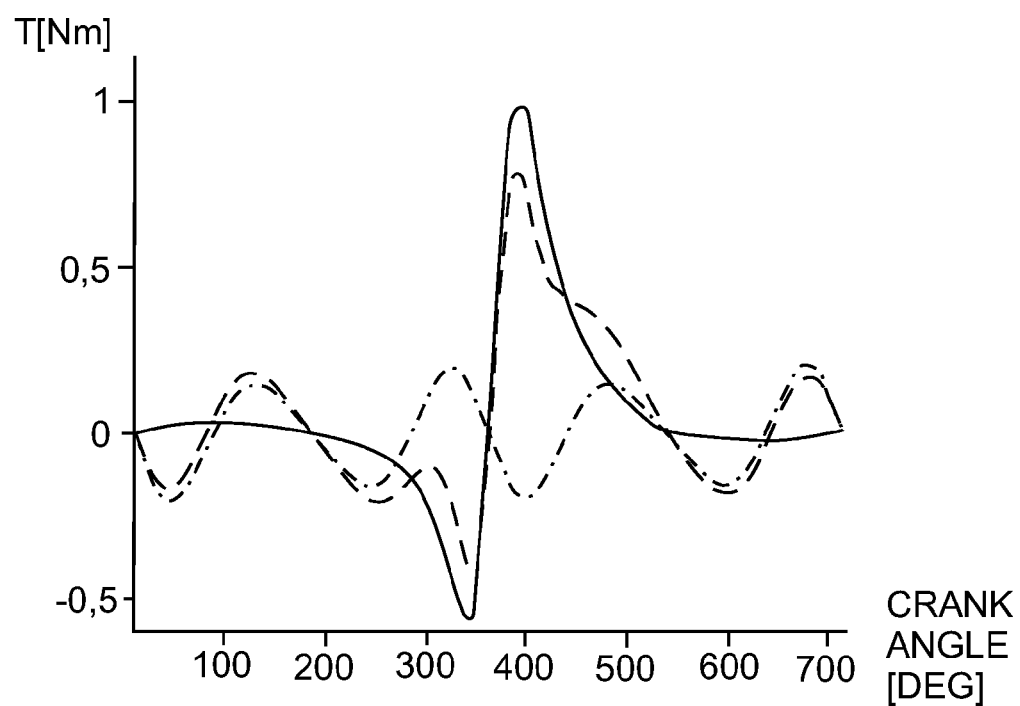

APPARATUS FOR IDENTIFYING A NON-UNIFORM SHARE OF CYLINDER POWER IN AN INTERNAL COMBUSTION PISTON ENGINE SYSTEM

This is a national stage application filed under 35 USC 371 based on International Application No. PCT/FI2006/050504 filed Nov. 21, 2006, and claims priority under 35 USC 119 of Finnish Patent Application No. 20055629 filed Nov. 30, 2005.

FIELD OF TECHNOLOGY

The present invention relates to an apparatus used in internal combustion piston engine systems on ships or in energy production. The apparatus is able to identify detrimental non-uniform power production of a cylinder or cylinders within an engine. The invention also relates to a method used in said apparatus.

PRIOR ART

Non-uniformity in power production due to differences between cylinders is manifested in all internal combustion piston engines. The differences are due to mechanical tolerances of the cylinders, mechanical and electromechanical tolerances of the fuel supply system, as well as other differences. Non-uniform shares of cylinder power cause torsional stress on the crankshaft of the engine and increase the level of engine vibrations. Therefore the mechanical components of the engine are exposed to additional stress due to non-uniform power of the cylinders.

EP 447 697 presents a system for damping the torsional vibrations of a diesel engine crankshaft. If the engine rotates in a RPM range in which detrimental torsional vibration is evident, the system delays the injection of fuel into the cylinders and sets a time limit for fuel injection. This moves the peak of each cylinder's pressure curve in relation to the crankshaft angle, which in turn reduces the torsional vibration manifested on the crankshaft.

WO 9429585 illustrates another system in which the torsional vibration of a diesel engine's main shaft is damped by keeping the exhaust valve of at least one cylinder open during the compression stroke of the cylinder and by increasing the power of at least one of the remaining cylinders to compensate for the lack of power in the non-pressurised cylinder or cylinders when the engine rotates in a RPM range in which detrimental torsional vibration is evident. This makes it possible to reduce the torsional vibration evident on the main shaft.

The problem with these reference publications is that the efficiency of the engine's power production is hampered when torsional vibrations are damped. Exhaust emission have a tendency to increase at the same time.

However, it is possible to identify a cylinder that produces substantially more or less power compared to average cylinder power of the cylinders. It is also known that a cylinder producing substantially high or substantially low power in proportion to average power is also a substantial source for fluctuation of the angular velocity of the engine shaft. Fluctuation of the angular velocity is one of the manifestations of torsional vibration. When the fuel supply to a cylinder producing too much or too little power is regulated so that the over/underproduction is reduced, the fluctuation of angular velocity will be reduced and the engine will rotate more smoothly. U.S. Pat. No. 6,302,083 presents such a solution in which a cylinder producing too much or too little power can be detected on the basis of crankshaft RPM measurement data. This solution works only if the power strokes of the cylinders do not overlap.

SHORT DESCRIPTION OF INVENTION

The object of the invention is to provide a method and apparatus for detecting a cylinder or cylinders producing detrimental torsional vibration on the shaft of an internal combustion piston engine. The object can be achieved by the means presented in the independent claims. The dependent claims describe various embodiments of the invention in more detail.

The invention utilises the firing order of the cylinders within the engine to identify the cylinder or cylinders that mainly contribute or, alternatively, contribute as little as possible to the production of certain harmonic frequencies in the engine's torque. In order to use the engine's torque for this purpose, the calculation of torque must take into account the non-linearities of the engine system. Thus the calculation of torque takes into account not only the properties of the engine but also the properties of the load and the shaft.

The method according to the invention identifies at least one of an internal combustion piston engine's cylinders, the power output of which deviates substantially from the power outputs of the other cylinders. The method measures the angular velocity of the engine shaft and the angular velocity of the shaft of a load connected to the engine shaft. The amplitudes and phases of the harmonic waves under examination are determined on the basis of the angular velocity measurement data. Furthermore, the offset and angular acceleration of the engine shaft, as well as the offset of the load shaft are determined at each harmonic wave of the angular velocities under examination. The parameters of the coupling between the engine shaft and the load shaft must also be determined at the harmonic frequencies under examination. The torques are calculated at the harmonic waves under examination by using the measured angular velocities, the determined offsets and angular accelerations of said shafts, as well as the coupling parameters. The cylinder or cylinders are identified by comparing the calculated torques with the firing order of the engine's cylinders.

An apparatus according to the invention that identifies at least one cylinder in an internal combustion piston engine in which the power output substantially differs from the power outputs of other cylinders comprises a central unit with interfaces for measurement sensors. Through the interfaces, the central unit is arranged to receive and process measurement data on the angular velocity of the engine shaft and measurement data on the angular velocity of the load shaft connected to the engine shaft, the measurement data incoming from measurement sensors connectable to the interfaces.

The central unit also comprises means for determining the amplitudes and phases of the harmonic waves under examination on the basis of the angular velocity measurement data, second means for determining the offset and angular acceleration of the engine shaft, as well as the offset of the load shaft, at each harmonic wave under examination, and third means containing information on the parameters of the coupling between the engine shaft and the load shaft at the harmonic waves under examination.

Furthermore, the central unit comprises fourth means for calculating torques at the harmonic waves under examination using the measured angular velocities, the determined offsets and angular accelerations of said shafts, as well as the coupling parameters, and fifth means for identifying a cylinder or cylinders by comparing the calculated torques with the firing order of the engine's cylinders.

LIST OF FIGURES

Figure 2:
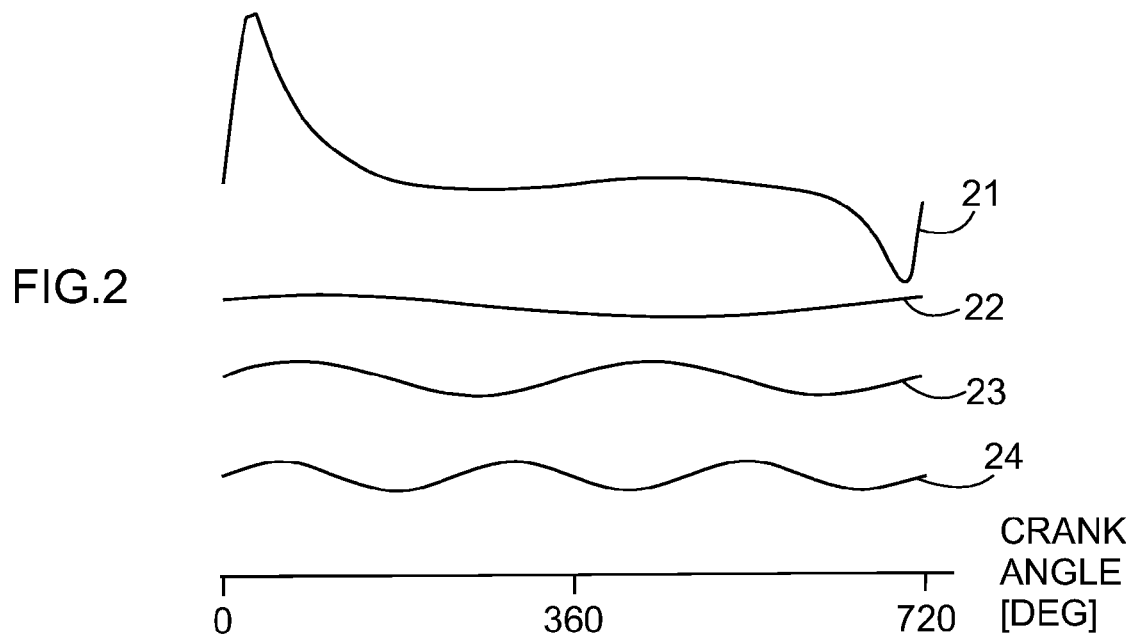
Figure 3:
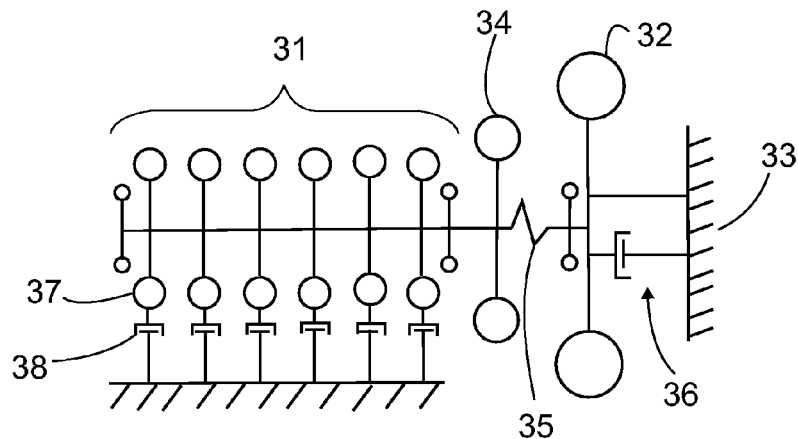
Figure 4:
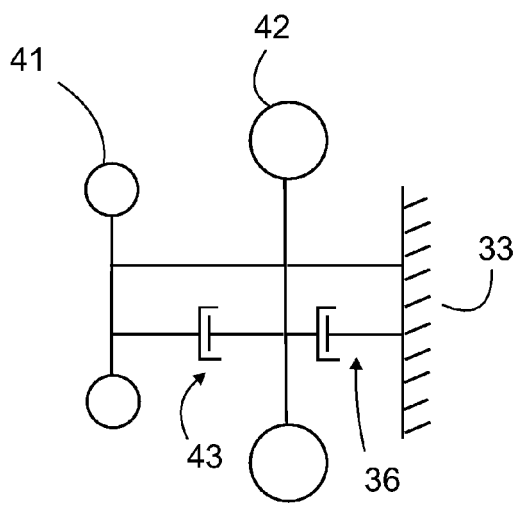
Figure 5A:
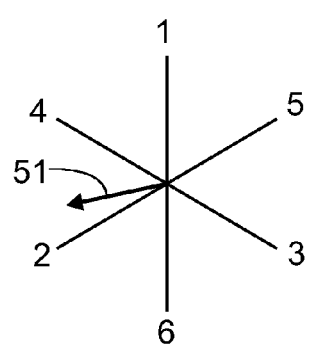
Figure 5B:
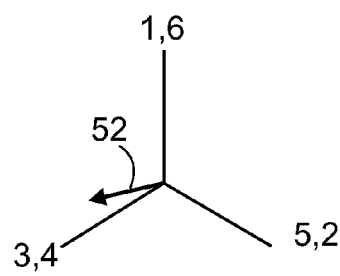
Figure 5C:
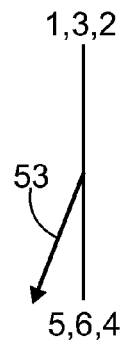
Figure 6:
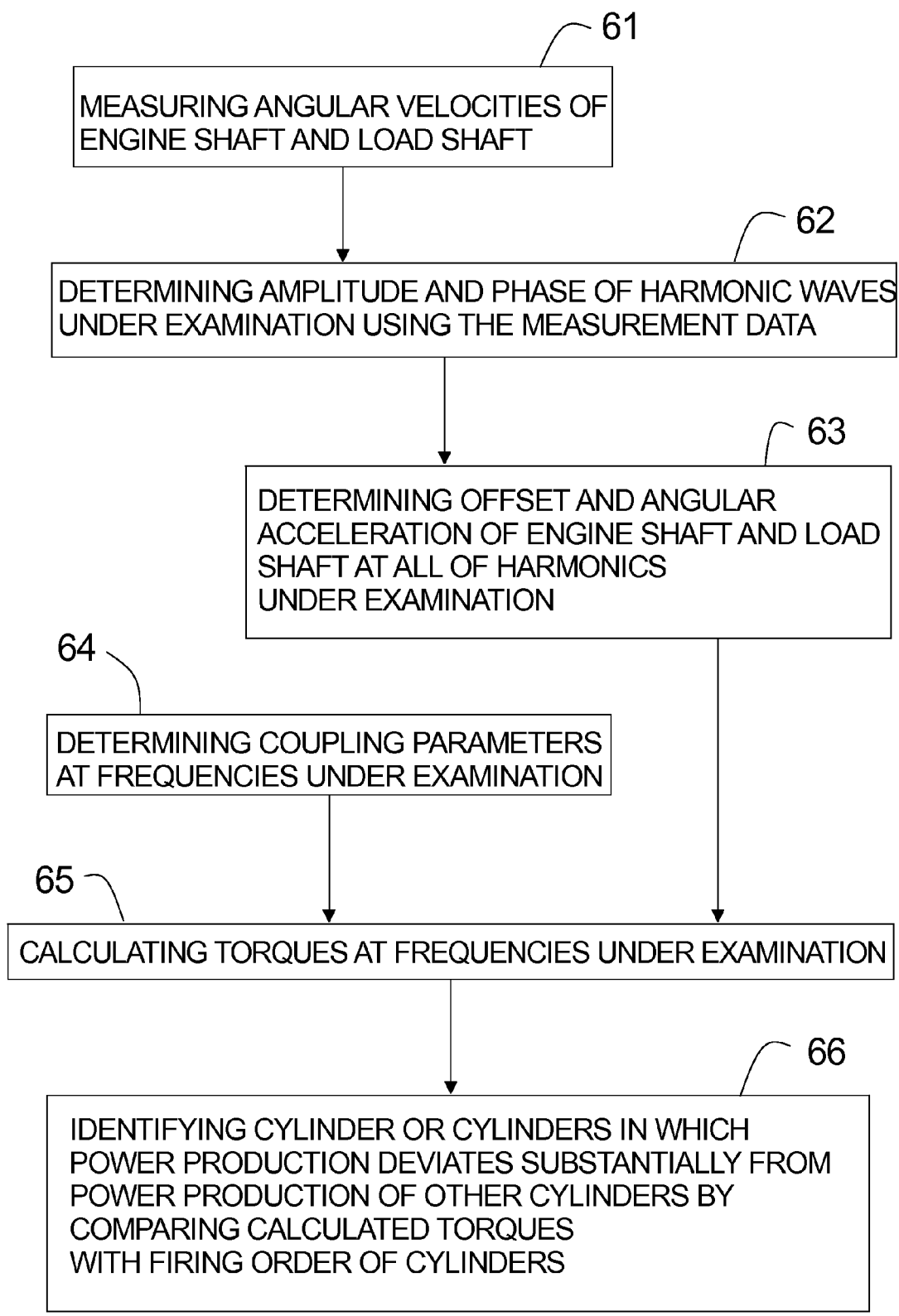
Figure 7:
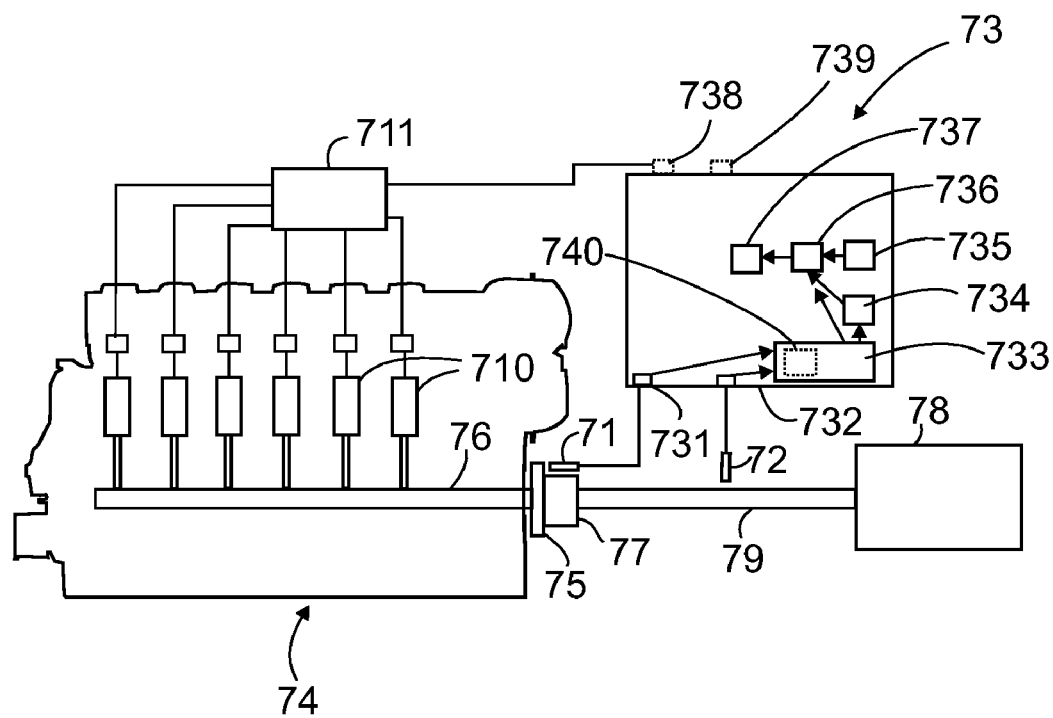

In the following, the invention is described in more detail by reference to the enclosed drawings, where FIG. 1 illustrates an example of the torques of one cylinder in an engine, FIG. 2 illustrates an example of the gas torque of one cylinder in an engine and its three harmonic components, FIG. 3 illustrates an example of an engine system model, FIG. 4 illustrates another example of an engine system model, FIGS. 5A, 5B and 5C illustrate the firing order of an engine's cylinders and the harmonic components of torque at the three lowest harmonic waves, FIG. 6 illustrates a flowchart example of the method according to the invention, and FIG. 7 illustrates an example of an apparatus according to the invention.

DESCRIPTION OF THE INVENTION

FIG. 1 illustrates an example of the torques of one cylinder in a four-stroke diesel engine, originating from the combustion of fuel and the rotation of mass. The gas torque is illustrated with a solid line, the mass torque with a dot-and-dash line and the tangential torque with a dashed line. The gas torque illustrates the torque originating from the combustion of fuel inside the cylinder. The mass torque originates from the reciprocating motion of the piston in the cylinder and the rotating movement of the crank mechanism. The tangential torque is the sum of the gas and mass torques effective on the engine's crankshaft. In a normal four-stroke multiple-cylinder internal combustion piston engine, the cycle of each cylinder takes two crankshaft rotations—that is, 720 degrees. It can be seen from the figure that the torque is at its highest during the power stroke and at its lowest during the compression stroke of the cylinder.

The torque curves of FIG. 1 are periodically repeating—that is, they can be represented as a series of harmonic (sinusoidal) waves in accordance with Fourier analysis. Hence, an individual harmonic wave is a harmonic component of the torque curve at the frequency of the harmonic wave (so-called harmonic frequency). FIG. 2 illustrates the gas torque curve 21 of an individual cylinder and its three lowest harmonic waves. Because the engine shaft rotates twice during the cycle of the cylinder's piston, the harmonic waves are represented as numbers 0.5, 1, 1.5, 2, 2.5 etc. from the lowest harmonic to the highest. These numbers are thus used to indicate the relation between the harmonic wave and the rotational frequency of the shaft. For example, the frequency of the number 1 harmonic wave is equal to the rotation frequency of the shaft. The curve 21 is the 0.5 harmonic. The curve 23 is the 1-harmonic and, correspondingly, the curve 24 is the 1.5-harmonic. The amplitude of the harmonic curves is mainly influenced by the gas torque curve.

During operation, each cylinder in an engine produces power that is conducted to the shaft of the engine system. The power on the shaft of the engine system is thus the sum of the power production of the cylinders. Because the power of each cylinder can be divided into harmonic components, the power on the shaft can also be divided into harmonic components. Some of the harmonic components on the shaft are strong because the sum of corresponding harmonic components in the cylinders amplifies the amplitude of the harmonic wave. Some of the harmonic components on the shaft are correspondingly weak because the sum of corresponding harmonic components in the cylinders attenuates the amplitude of the harmonic wave. The more even the power production in each cylinder, the smaller the fluctuation in power during two rotations of the engine. This means that the harmonic components are also weaker.

It has been verified that the three lowest harmonic components manifested on the shaft of an internal combustion piston engine system used on a ship or in energy production constitute a significant part of the detrimental torsional vibration of the shaft. Therefore, in order to determine the intensity of torsional vibration, the three lowest harmonic components of the torque manifested on the shaft must be calculated. It must be noted that other harmonic components can also affect the torsional vibration and they can be calculated if necessary.

An internal combustion piston engine system on a ship or in energy production includes not only the engine but also a load and a coupling that connects the engine shaft and the load shaft. In this context, the common shaft formed in this way is called the engine system shaft or the system shaft. In energy production, for example, the load is a generator producing electric power into an electric grid connected to the generator. On a ship, the load is usually a propeller. On a ship, other components such as generators, conic couplings and various types of gears can also be connected to the system shaft. Thus the entirety of the engine system is very dynamic, and the load has a very strong effect on the dynamics. It is essential for the calculation of engine shaft torque that the overall dynamics of the engine system are taken sufficiently into account in order to have the calculated torque correspond with reality sufficiently well. It is thus essential that the system be modelled with sufficient precision. If the system model is too coarse, it does not correspond with reality sufficiently well. On the other hand, if the model is precise, the calculation of torque requires a more complex system, which is very difficult or even impossible to implement in practice.

FIG. 3 illustrates an example of a four-stroke six-cylinder engine system model in which the engine 31 is coupled to drive a generator 32 connected to an electric grid 33. There is a flywheel 34 on the engine shaft. The principal purpose of the flywheel is to even out the rotational speed of the engine shaft. The engine shaft and the generator shaft are interconnected through a coupling 35. The connection between the generator 32 and the electric grid 33 is illustrated as a dynamic link 36. The circles in FIG. 3 represent masses rotating in relation to the shafts. For example, the mass of the piston/crank mechanism of each cylinder is illustrated by circles 37. The fixed parts of the model, such as the electric grid 33, are illustrated as an area of diagonal lines. Dampings are represented by the box/plate symbol 38. The coupling 35 between the generator and the engine is flexible.

The model illustrated in FIG. 3 must be simplified in order to create a practically well-functioning model. The natural frequencies of the engine system are used as the starting point for simplifying the model. Natural frequencies refer to standing waves of vibration manifested in the system. It has been estimated that the three first natural frequencies of a crankshaft system similar to FIG. 3 are 1.5, 5.5 and 50.6 Hz. The first nodal point (non-vibrating point) of 1.5 Hz is at the electric grid 33, the nodal point of the second frequency is at the coupling 35, and the nodal point of the third frequency 50.6 Hz is within the engine 31. The firing frequency of the engine determines the upper limit of the frequency range within which the model should be precise. Because the engines used on ships and in energy production are usually medium-speed diesel engines, the third natural frequency is outside the precisely modelled frequency range. For example, the firing frequency of a four-stroke six-cylinder engine running at 500 rpm is 25 Hz.

Because the nodal point of the third natural frequency is outside the frequency range under examination, it is disregarded. The nodal points of the first and second frequencies are included in the simplified model. Let us assume that the system is rigid on both sides of a single node. On the basis of this, masses on the same side of the node can be represented as a single mass. Therefore the masses of the engine and flywheel are represented as a single mass 41, and the mass of the generator is represented as a single mass 42 viewed from the coupling 43 (the second node). See FIG. 4. The coupling is represented as an ideal coupling. The electric grid 33 is the first nodal point so it is included in the model. The electric grid was originally represented as a single entity so there are no changes in its modelling. The connection 36 between the electric grid 33 and the generator 42 is still represented as an ideal link.

FIG. 4 is a simpler model but is not yet feasible for practical applications. It is difficult to practically estimate the dynamics between the generator 42 and the load—that is, the electric grid. However, the dynamics must be taken into account in order to create a usable measurement apparatus. Due to the complexity of installations on a ship, estimation can be practically impossible. Furthermore, the properties of the coupling 43 are heavily non-linear because the coupling is usually flexible.

Flexible couplings are thus typically very non-linear. In other words, the rigidity and damping of the coupling are heavily dependent on the frequency. The properties of the coupling are thus frequency-specific, so the coupling has properties specific to each frequency of vibration manifested in the system. Furthermore, if the coupling is made of rubber, the properties are also dependent on the temperature of the rubber. Many manufacturers of couplings present formulas for taking the effect of frequency dependency into account. It can be noted that taking the properties of a flexible coupling into account (observing frequency behaviour and maybe also temperature behaviour) is essential for the estimation of frequency vibrations.

If we also accept that information about the generator's rotational speed contains sufficient information about the link between the generator and the electric grid, we can calculate the torque of the engine shaft using the formula $$M = J\ddot{\phi}_1 + D\dot{\phi}_1 + C(\dot{\phi}_1 - \dot{\phi}_2) + K(\phi_1 - \phi_2) \quad (1)$$

in which
M is the torque on the engine shaft,
J is the engine's moment of inertia,
$\phi_1$ is the angle of the engine shaft,
$\phi_2$ is the angle of the generator shaft,
D is the damping factor of the engine,
C is the dynamic damping factor of the coupling, and
K is the dynamic rigidity of the coupling.

Formula 1 can be used to calculate the torque of the engine shaft taking the properties of the coupling into account. The effect of the load and its link is taken into account in the $\phi_2$ value and its derivatives. $\dot{\phi}_2$ is thus the rotational speed of the measured generator shaft. Correspondingly, $\dot{\phi}_1$ is the rotational speed of the engine shaft that can be measured. The rotational speed measurements can be used to calculate the required shaft angles and accelerations. It is convenient to use the TDC (Top Dead Centre) of the engine's first cylinder as a reference point for the calculation of angles. The TDC of another cylinder can also be used.

In the models of FIGS. 3 and 4, the load is a generator and an electric grid connected to it. However, some other load can be modelled in place of them, such as the shaft system of a ship's propeller. Thus Formula 1 can also be used for other loads. In this context, a generator load has been used as an example due to its illustrative nature.

The amplitudes and phases of the different frequencies of torque can be determined from the calculated engine shaft torque through a Fourier transform. This will also reveal the amplitude and phase of the desired harmonic waves. Let us represent the determined amplitude and phase of the harmonic wave as signal $\theta_n$, which is thus $\theta_n = A(n)e^{j\phi(n)}$. A is the amplitude of the n-harmonic. $\phi(n)$ is the phase of the n-harmonic. It is also possible to calculate the harmonic components of torque separately in the first place, in which case the total torque of the shaft is not calculated.

The times of ignition of the engine's cylinders are evenly distributed over different points of crankshaft rotation in order to create a crankshaft torque curve that is as even as possible. When all cylinders in the engine produce equal power, the lowest (and higher) harmonic waves of the cylinders compensate each other due to the phase differences between the times of ignition of each cylinder. In this case, the harmonic waves in question are not manifested on the engine shaft. However, if one or more cylinders in the engine produce more power than the other cylinders, a certain harmonic component or several harmonic components can be observed on the engine shaft. Correspondingly, a harmonic component is observable if one or more cylinders operate at reduced power compared to the other cylinders. Uneven power production of an engine is normally evident in the lowest harmonics.

Because the intervals between the ignition times of the engine's cylinders are fixed periods during the rotation of the engine's crankshaft (720 degrees in a four-stroke cylinder), the cylinder currently in the working cycle can be determined on the basis of the signal $\theta_n$. In other words, the cylinder producing the harmonic signal in question can be determined on the basis of comparing the ignition times of the cylinders and the signal $\theta_n$. Because the harmonic signal represents torsional vibration, the cylinder in question is also the source of torsional vibration. Consecutive ignition times of different cylinders form the firing order of the cylinders. In a six-cylinder engine, the firing order of the cylinders can be 1, 5, 3, 6, 2, 4, for example; during 720 degrees of angular rotation, the first cylinder is fired first and the fourth cylinder is fired last.

FIGS. 5A, 5B and 5C illustrate a comparison between the $\theta_n$ signals and the ignition times of the engine's cylinders. FIG. 5A illustrates the phase and amplitude of the 0.5-harmonic wave 51 in relation to the ignition times of the engine's cylinders. The firing order of the cylinders is 1, 5, 3, 6, 2, 4. Correspondingly, FIG. 5B illustrates the 1-harmonic and FIG. 5C illustrates the 1.5-harmonic. In order to make comparison possible, the ignition times must be reduced to the harmonic frequency being examined. In FIG. 5B, the 1-harmonic wave makes two cycles during the engine's work cycle—that is, 720 degrees of crankshaft rotation. In other words, the crankshaft and the 1-harmonic are synchronous. Because the ignition times of the cylinders occur at 120 degree intervals when evenly distributed over the 720 degrees of crankshaft rotation, the intervals between the ignition times are 120 degrees in FIG. 5B. Because the 0.5-harmonic makes only one cycle during two crankshaft rotations, the ignition times are reduced to the frequency of the 0.5-harmonic by multiplying the normal ignition interval by 0.5. Thus the angle of the ignition intervals in FIG. 5A becomes 60 degrees. Correspondingly, the ignition interval becomes 180 degrees in the case of the 1.5-harmonic wave as illustrated in FIG. 5C.

The harmonic $\theta_{0.5}$ signal 51 illustrated in FIG. 5A is closest to the ignition times of cylinders 2 and 4. It can thus be concluded that cylinder 2, cylinder 4 or both cylinders are producing excess power that causes the 0.5-harmonic wave. On the other hand, it can also be concluded that cylinder 5, cylinder 3 or both are producing too little power because the negative signal 51 is closest to the ignition times of cylinders 5 and 3. Therefore the examination of the lowest harmonic wave is not enough to accurately point out the cylinder producing the harmonic. It is thus necessary to examine several harmonic waves.

In FIG. 5B, the 1-harmonic $\theta_1$ signal 52 is closest to the ignition times of cylinders 1, 3, 4 and 6. Hence, one of these cylinders, or the cylinders jointly, are producing excess power. It can again be noted that correspondingly, one or more of the cylinders 1, 2, 5 and 6 are producing too little power. A joint examination of signals $\theta_{0.5}$ and $\theta_1$ brings us to the conclusion that cylinder 4 is producing too much power or cylinder 5 is producing too little power because cylinders 4 and 5 come up in the examination of both signals. In FIG. 5B, the negative 1-harmonic $\theta_1$ signal 52 is closest to the ignition times of cylinders 1, 6, 5 and 2. An additional examination of the 1.5-harmonic $\theta_{1.5}$ signal 53 in FIG. 5C reveals that it is closest to the ignition times of cylinders 5, 6 and 4. The negative $\theta_{1.5}$ signal is closest to the ignition times of cylinders 1, 3 and 2. It is thus observable from FIGS. 5A, 5B and 5C that cylinder 4 produces excess power at all of the harmonic frequencies under examination and is therefore the origin of the torsional vibration of the engine system shaft. This information can be utilised for damping the torsional vibration.

Thus an examination of several harmonic frequency components can reveal the cylinder or cylinders that produce too much or too little power. A cylinder that is observed to produce too much (or too little) power in all of the frequency components being examined is the cylinder causing the torsional vibration on the shaft. In FIGS. 5A, 5B and 5C, cylinder 4 was observed to produce excess power at every frequency under examination. On the other hand, cylinder 5 was not running at reduced power because this was not possible on the basis of examining the 1.5-harmonic wave.

In large engines, the ignition cycles overlap and it is not always possible to determine precisely which cylinder is producing too much or too little power. A few degrees of difference in crankshaft angle between the firing of two cylinders is not sufficient when using torque information only. In this case two (or more) adjacent cylinders are perceived as one virtual cylinder that is the source of torsional vibration. In practice this means that difference between the power production of the cylinders comprised in a virtual cylinder must be allowed. An alternative is that in addition to torque information, some other engine information can be used that allows the cylinder to be precisely located. For example, cylinder-specific cylinder pressure, exhaust temperature or fuel supply volume can be utilised. These principles of identification are used in different embodiments of the invention (methods, apparatuses).

FIG. 6 illustrates a flowchart example of a method according to the invention for identifying a cylinder or cylinders in which the power production substantially deviates from the power production of the engine's other cylinders. Firstly, angular velocity of the engine shaft—that is, the crankshaft—and angular velocity of the load shaft are measured 61. The angular velocities are measured using sensors installed in suitable positions for carrying out the measurements. The flywheel of the engine is a suitable location for measuring the angular velocity of the engine shaft. Correspondingly, the load shaft (in a generator load, the rotor) on the load side of the coupling is a suitable location for measuring the angular velocity of the load shaft.

Next, the required parameter values for calculating the torques must be determined 62, 63, 64. The measured angular velocity data is used to determine 62 the amplitudes and phases of the harmonic waves under examination (such as the three lowest harmonics).

A Fourier transform can be performed on the measurement data before determining the amplitudes and phases. It is feasible to perform the transform as a discrete transform, for example a FFT (Fast Fourier Transform). In order to minimise the computing capacity required for practical applications, it is feasible to use an appropriate filtering method for the measurement signals, such as Goertzel filters. A Goertzel filter is a second-order IIR filter that recursively calculates a complex Fourier coefficient $X_{FK}[k]$ for an individual frequency. The k in square brackets is the index of each measurement, indicating a certain frequency in the range being examined. The complex $X_{FK}$ contains information on both amplitude and phase. The use of a Fourier transform facilitates the implementation of the stages of the method and therefore also its practical implementation.

The calculation of torques also requires the determination 63 of angular offsets of the engine shaft and load shaft, as well as angular accelerations of the engine shaft, at each harmonic wave under examination. It is feasible to select the top dead centre of one of the engine's cylinders as reference point for shaft angle. In the frequency domain, the angular offset is $$X_{FK\varphi}[k] = \frac{X_{FK\phi}}{j\omega_0 k}$$

and the angular acceleration is $$X_{FK}[k] = j\omega_0 k X_{FK, \dot{\phi}}$$

in which $\omega_0$ is the frequency of the window (time interval) used for measurement.

The dynamic parameters of the engine system's coupling are determined 64 separately for the frequencies under examination. Information from the coupling manufacturer can be utilised for the determination of the parameters. The coupling parameters can also be determined in advance because the frequency of the harmonic components under examination and information about the coupling are available in advance. The parameters determined in advance or in real time are utilised for the calculation of torques. Thus the stage of determining the coupling parameters must be interpreted extensively in this context so that it also comprises the introduction of predetermined parameters.

The torques are calculated 65 at the harmonic waves under examination by using the measured angular velocities, the determined offsets and angular accelerations of the shafts, as well as the coupling parameters. For example, for calculation performed in the frequency domain, torque can be represented as follows:

$$X_{FKM} = JX_{FK_1} + DX_{FK_1} + C(X_{FK_1} - X_{FK_2}) + K(X_{FK\phi_1} - X_{FK\phi_2}) \quad (2)$$

in which $X_{FKM}$ is the torque to be calculated, J is the engine's moment of inertia, $X_{FK_1}$ is the angular acceleration of the engine shaft, D is the damping factor of the engine, $X_{FK_1}$ is the angular velocity of the engine, C is the dynamic damping factor of the coupling, $X_{FK_2}$ is the angular velocity of the load shaft, K is the dynamic rigidity of the coupling, $X_{FK\Phi_1}$ is the angular offset of the engine shaft and $X_{FK\Phi_2}$ is the angular offset of the load shaft.

The cylinder or cylinders in which power production deviates most from the average power production of the cylinders in the engine are identified 66 by comparing the calculated torques with the firing order of the engine's cylinders. The above is a description of the principle of identification by way of example. In practice the power output of an individual cylinder deviates slightly from the power outputs of the other cylinders, and weak harmonic waves can be observed. However, if the power of a cylinder deviates substantially from the other cylinders, the amplitude of the harmonic wave can be considered substantial. In this case, the power of the cylinder also deviates substantially from the average power of the cylinders.

FIG. 7 illustrates an example of an apparatus according to the invention. The apparatus according to the invention comprises a central unit 73 with interfaces 731, 732 for measurement sensors 71, 72. Through the interfaces, the central unit is arranged to receive and process measurement data on the angular velocity of the engine shaft 76 and measurement data on the angular velocity of the load shaft 79 connected to the engine shaft, the measurement data incoming from measurement sensors connectable to the interfaces. It is feasible to install the sensor 71 measuring the angular velocity of the engine shaft 76 in connection with the flywheel 75 of the engine 74. The sensor 72 measuring the angular velocity of the shaft of the load 78 is installed in connection with the load shaft 79—that is, when viewed from the shaft coupling 77, to the opposite side compared to the sensor 71 installed in connection with the flywheel.

The central unit 73 also comprises means 733 for determining the amplitudes and phases of the harmonic waves under examination on the basis of the angular velocity measurement data, second means 734 for determining the offset and angular acceleration of the engine shaft, as well as the offset of the load shaft, at each harmonic wave under examination, and third means 735 containing information on the parameters of the coupling between the engine shaft and the load shaft at the harmonic waves under examination. An alternative to the third means 735 containing predetermined parameter information is that the third means determine the parameter information in real time or almost real time, and the information is stored for the calculation of torques. Thus it is not necessary to determine the coupling parameters continuously even though this is possible.

In practice the means 733 for determining the amplitudes and phases of the harmonic waves under examination comprise filters 740 to minimise the required computing capacity, such as Goertzel filters. The filters also perform a Fourier transform in practice.

It must be noted that if the method according to the invention is performed in the time domain, the filters 740 are band-pass filters that pass the desired harmonic frequencies. In this case, the means 733 determine the amplitudes and phases of the harmonics that have passed through the filters. The other means within the central unit are also arranged to process signals in the time domain.

Furthermore, the central unit comprises fourth means 736 for calculating torques at the harmonic waves under examination using the measured angular velocities, the determined offsets and angular accelerations of the shafts, as well as the coupling parameters, and fifth means 737 for identifying a cylinder or cylinders within the engine by comparing the calculated torques with the firing order of the engine's cylinders.

Thus the central unit identifies a cylinder 710 or cylinders within the engine that produce too much or too little power in proportion to the engine's average cylinder power. For the purpose of identification, the central unit utilises the method according to the invention that is described above. Hence, the central unit takes into account the properties of the coupling 77 and the engine 74.

The central unit performs the stages of the method described above. The measurement stage of the method must be construed as refinement of the signal into the desired information. In this case, measuring the angular velocities thus refers to the functionality of the central unit's interfaces that receive signals from the measurement sensors and extract the actual angular velocity information from the measurement signals. Hence, measurement does not refer to the operation of the sensor. The sensors serve as sources of information processed by the actual measurement operations.

The principal connections between the elements of the central unit 73 are illustrated by arrows in FIG. 4. The means 736 for calculating torques have the required connections to the other elements.

The division into different elements illustrated in the figure is one embodiment. The elements can also be implemented in other ways. For example, the filters 740 and the elements 733 for determining the amplitudes and phases of the harmonic waves can be separate or constitute the same element.

Furthermore, the central unit 73 can comprise at least one additional interface 738, 739, through which the central unit can be connected to an engine control unit 711, a CAN bus or an Ethernet network, for example. Through the additional interface or interfaces, the central unit can receive necessary additional information for identifying the cylinder or cylinders that produce a non-uniform share of power. The additional information can be, for example, cylinder-specific cylinder pressure, cylinder-specific exhaust temperature or cylinder-specific fuel supply volume. For example, if a cylinder that has a power production substantially deviating from the power production of the engine's cylinders must be selected from among two cylinders (cylinders identified using harmonic waves), the cylinder with a higher cylinder pressure compared to the other cylinders shall be selected. The additional interfaces can also be used for connecting more sensors to the central unit. FIG. 7 illustrates the use of additional elements to the central unit. The central unit 73 is connected to an engine control unit 711, which in turn is connected to cylinder-specific elements such as pressure sensors, temperature sensors or flow sensors. The central unit is also able to provide information about the identified cylinder or cylinders through the interfaces to systems that need the information, such as an engine control unit 711.

The central unit in FIG. 7 can be implemented in many different ways. Its operation can be achieved using an ASIC (Application Specific Integrated Circuit), for example. The central unit can also be implemented as computer software installed on a computer appropriate for the purpose. During operation, the computer, ASIC or some other embodiment implements the functions according to the invention. It is thus clear that the elements illustrated in FIG. 7 can be combined into a single entity.

The invention provides a method and apparatus well suited for practical applications. It is suitable for use in energy production and on ships, in which applications the ignition cycles of the engine can overlap. Utilisation of the invention makes it possible to maintain good efficiency of the engine's power production and control exhaust emissions.

It is evident from the above that the invention is not limited to the embodiments described in this text but can be implemented in many other different embodiments within the scope of the inventive idea.

The invention claimed is:

1. A method for identifying at least one cylinder in an internal combustion piston engine having an engine shaft coupled to a load shaft, the power output of which deviates substantially from power outputs of the other cylinders, comprising:

selecting a plurality of harmonic frequencies,
measuring the angular velocity of the engine shaft and the angular velocity of the shaft of a load connected to the engine shaft,
determining amplitude and phase of each of the selected harmonic frequencies of the measured angular velocities,
determining an offset and angular acceleration of the engine shaft, as well as an offset of the load shaft at each of the selected harmonic frequencies of the measured angular velocities,
determining frequency-dependent rigidity and frequency-dependent damping of the coupling between the engine shaft and the load shaft at the selected harmonic frequencies,
calculating torques at the selected harmonic frequencies by using the measured angular velocities, the determined offsets and angular accelerations of said shafts, and the determined coupling parameters, and
identifying the cylinder or cylinders by comparing the calculated torques with a firing order of the engine's cylinders,
and wherein the step of identifying the cylinder or cylinders comprises comparing the torques calculated at each of the selected harmonic frequencies with ignition times of the cylinders in order to detect the cylinders that produce the most deviating amount of power at the selected harmonic frequencies, and
the cylinder that is found to produce too much or too little power at the selected harmonic frequencies is selected as the identified cylinder.

2. A method according to claim 1, wherein the step of identifying comprises identifying at least two cylinders having consecutive ignition times as a virtual cylinder.

3. A method according to claim 1, comprising using cylinder-specific fuel volume, cylinder pressure and/or cylinder-specific exhaust temperature for identifying the cylinder or cylinders.

4. A method according to claim 1, wherein the selected harmonic frequencies are three lowest harmonic frequencies.

5. A method according to claim 1, wherein the selected harmonic frequencies are at least three lowest harmonic frequencies.

6. A method according to claim 1, comprising performing a discrete Fourier transform on the measurement data before determining the amplitude and phase of the selected harmonic frequencies from the angular velocity measurement data.

7. A method according to claim 6, wherein the transform is a Fast Fourier Transform.

8. A method according to claim 6, wherein the torques are calculated using the formula $$X_{FKM} = JX_{FK_1} + DX_{FK_1} + C(X_{FK_1} - X_{FK_2}) + K(X_{FK\phi_1} - X_{FK\phi_2})$$

in which $X_{FKM}$ is the torque to be calculated, J is the engine's moment of inertia, $X_{FK_1}$ is the angular acceleration of the engine shaft, D is the damping factor of the engine, $X_{FK_1}$ is the angular velocity of the engine, C is the dynamic damping factor of the coupling, $X_{FK_2}$ is the angular velocity of the load shaft, K is the dynamic rigidity of the coupling, $X_{FK\phi_1}$ is the angular offset of the engine shaft and $X_{FK\phi_2}$ is the angular offset of the load shaft.

9. A method according to claim 1, wherein a top dead centre of one of the engine's cylinders is used as a reference point for determining shaft offsets.

10. An apparatus for identifying at least one of an internal combustion piston engine's cylinders, the power output of which deviates substantially from the power outputs of the other cylinders, the engine having an engine shaft coupled to a load shaft, wherein the apparatus comprises a central unit with interfaces for connection to measurement sensors for providing measurement data relating to the angular velocity of the engine shaft and measurement data relating to the angular velocity of a load shaft connected to the engine shaft, said central unit comprises means for determining amplitudes and phases of the angular velocity measurement data at least the three lowest harmonic frequencies of said angular velocities,
second means for determining an offset and angular acceleration of the engine shaft, as well as an offset of the load shaft at each of said plurality of harmonic frequencies,
third means containing information on frequency-dependent rigidity and frequency-dependent damping of the coupling between the engine shaft and the load shaft at each of said plurality of harmonic frequencies,
fourth means for calculating torques at each of said plurality of harmonic frequencies by using the measured angular velocities, the determined offsets and angular accelerations of said shafts, as well as the coupling parameters, and
fifth means for identifying the cylinder or cylinders by comparing the calculated torques with a firing order of the engine's
cylinders and identifying the cylinder that is found to produce too much or too little power at all of the harmonic frequencies.

11. An apparatus according to claim 10, wherein at least two cylinders having consecutive ignition times constitute a virtual cylinder that can be identified.

12. An apparatus according to claim 10, wherein the central unit comprises filters for filtering the measurement data and performing a Fourier transform.

13. An apparatus according to claim 12, wherein the fourth means use the formula $$X_{FKM} = JX_{FK_1} + DX_{FK_1} + C(X_{FK_1} - X_{FK_2}) + K(X_{FK\phi_1} - X_{FK\phi_2})$$

in which $X_{FKM}$ is the torque to be calculated, J is the engine's moment of inertia, $X_{FK_1}$ is the angular acceleration of the engine shaft, D is the damping factor of the engine, $X_{FK_1}$ is the angular velocity of the engine, C is the dynamic damping factor of the coupling, $X_{FK_2}$ is the angular velocity of the load shaft, K is the dynamic rigidity of the coupling, $X_{FK\phi_1}$ is the angular offset of the engine shaft and $X_{FK\phi_2}$ is the angular offset of the load shaft.

14. An apparatus according to claim 10, wherein the second means are arranged to use a top dead centre of one of the engine's cylinders as a reference point for determining shaft offsets.

15. An apparatus according to claim 10, wherein the central unit comprises at least one additional interface through which the central unit can be connected to external systems.

16. An apparatus according to claim 15, wherein the external device is an engine control unit, a CAN bus or a TCP/IP network.

17. An apparatus according to claim 10, wherein the apparatus includes measurement sensors.

18. A method of operating a multi-cylinder internal combustion piston engine having an engine shaft coupled to a load shaft for driving a load, wherein each cylinder produces a power output and the engine shaft and the load shaft each rotate with an angular velocity, said method comprising:

measuring the angular velocity of the engine shaft and the angular velocity of the load shaft, determining amplitudes and phases of selected harmonic frequencies of the angular velocities of the engine shaft and load shaft, determining an offset and angular acceleration of the engine shaft, as well as an offset of the load shaft at each of said selected harmonic frequencies of the angular velocities, determining parameters of the coupling between the engine shaft and the load shaft at the selected harmonic frequencies, the coupling parameters being frequency-dependent rigidity and frequency-dependent damping of the coupling, calculating torques at the selected harmonic frequencies by using the measured angular velocities, the determined offsets and angular accelerations of said shafts, as well as the coupling parameters, and identifying at least one cylinder of which the power output deviates substantially from the power outputs of other cylinders of the engine, by comparing the calculated torques with a firing order of the engine's cylinders, wherein the step of identifying at least one cylinder includes comparing the torque calculated at each selected harmonic frequency with ignition times of the cylinders in order to detect the cylinder that produces the most deviating amount of power at each selected harmonic frequency, and the method further comprises identifying the cylinder that produces too much or too little power at all of the selected harmonic frequencies as a cylinder of which the power output deviates substantially from power outputs of the other cylinders.

* * * * *

UNITED STATES PATENT AND TRADEMARK OFFICE
CERTIFICATE OF CORRECTION

PATENT NO. : 7,926,329 B2
APPLICATION NO. : 12/095339
DATED : April 19, 2011
INVENTOR(S) : Fredrik Ostman It is certified that error appears in the above-identified patent and that said Letters Patent is hereby corrected as shown below:

Cover page item (73), left column, the name of the assignee should be --Wärtsilä Finland Oy--

Column 5, line 48, equation 1 should be -- $M = J\ddot{\phi}_1 + D\dot{\phi}_1 + C(\dot{\phi}_1 - \dot{\phi}_2) + K(\phi_1 - \phi_2)$ --

Column 8, line 18, " $X_{FK}[k]$ " should be -- $X_{FK\phi}[k]$ --

Column 8, line 21, " $X_{FK}$ " should be -- $X_{FK\phi}$ --

Column 8, line 33, " $X_{FK\phi}[k] = \dfrac{X_{FK\phi}}{j\omega_0 k}$ " should be -- $X_{FK\dot{\phi}}[k] = \dfrac{X_{FK\dot{\phi}}}{j\omega_0 k}$ --

Column 8, line 38, " $X_{FK}[k] = j\omega_0 k X_{FK,\phi}$ " should be -- $X_{FK\dot{\phi}}[k] = j\omega_0 k X_{FK\phi}$ --

Column 8, line 60, equation 2 should be

-- $X_{FKM} = JX_{FK\ddot{\phi}_1} + DX_{FK\dot{\phi}_1} + C(X_{FK\dot{\phi}_1} - X_{FK\dot{\phi}_2}) + K(X_{FK\phi_1} - X_{FK\phi_2})$ --

Column 8, line 63, " $X_{FK}$ " should be -- $X_{FK\ddot{\phi}_1}$ --

Column 8, line 65, " $X_{FK_1}$ " should be -- $X_{FK\dot{\phi}_1}$ --

Column 8, line 66, " $X_{FK_2}$ " should be -- $X_{FK\dot{\phi}_2}$ --

Claim 8, line 3 (column 11, line 64),
" $X_{FKM} = JX_{FK_1} + DX_{FK_1} + C(X_{FK_1} - X_{FK_2}) + K(X_{FK\phi_1} - X_{FK\phi_2})$ " should be -- $X_{FKM} = JX_{FK\ddot{\phi}_1} + DX_{FK\dot{\phi}_1} - C(X_{FK\dot{\phi}_1} - X_{FK\dot{\phi}_2}) + K(X_{FK\phi_1} - X_{FK\phi_2})$ --

Claim 8, line 5 (column 11, line 67), " $X_{FK_1}$ " should be -- $X_{FK\ddot{\phi}_1}$ --

Claim 8, line 6 (column 12, line 1), " $X_{FK_1}$ " should be -- $X_{FK\dot{\phi}_1}$ --

Claim 8, line 8 (column 12, line 3), " $X_{FK_2}$ " should be -- $X_{FK\dot{\phi}_2}$ --

Signed and Sealed this
Twelfth Day of July, 2011

David J. Kappos
*Director of the United States Patent and Trademark Office*

CERTIFICATE OF CORRECTION (continued)

U.S. Pat. No. 7,926,329 B2

Claim 13, line 3 (column 12, line 51),

"$X_{FKM} = JX_{FK_1} + DX_{FK_1} + C(X_{FK_1} - X_{FK_2}) + K(X_{FK\phi_1} - X_{FK\phi_2})$" should be -- $X_{FKM} = JX_{FK\ddot{\phi}_1} + DX_{FK\dot{\phi}_1} + C(X_{FK\dot{\phi}_1} - X_{FK\dot{\phi}_2}) + K(X_{FK\phi_1} - X_{FK\phi_2})$ --

Claim 13, line 5 (column 12, line 54), "$X_{FK_1}$" should be -- $X_{FK\ddot{\phi}_1}$ --

Claim 13, line 6 (column 12, line 55), "$X_{FK_1}$" should be -- $X_{FK\dot{\phi}_1}$ --

Claim 13, line 8 (column 12, line 57), "$X_{FK_2}$" should be -- $X_{FK\dot{\phi}_2}$ --